United States Patent [19]

McClenny

[11] 4,179,904
[45] Dec. 25, 1979

[54] FREEZERS

[76] Inventor: Carl O. McClenny, 6154 Willer's Way, Houston, Tex. 77057

[21] Appl. No.: 784,780

[22] Filed: Apr. 5, 1977

Related U.S. Application Data

[63] Continuation-in-part of Ser. No. 344,122, Mar. 23, 1973, abandoned.

[51] Int. Cl.² .............................................. A23G 3/00
[52] U.S. Cl. ..................................... 62/342; 62/381; 366/219
[58] Field of Search ................... 259/57, 81 R, 81 A, 259/89; 62/342, 381

[56] References Cited

U.S. PATENT DOCUMENTS

| 218,129 | 8/1879 | Minnick | 259/57 |
|---|---|---|---|
| 357,602 | 2/1887 | Inzer | 259/89 |
| 553,158 | 1/1896 | Harton | 62/342 |
| 600,571 | 3/1898 | Bagley | 62/342 |
| 620,615 | 3/1899 | Shaffer | 62/342 |
| 700,591 | 5/1902 | Werner | 259/57 |
| 1,590,939 | 6/1926 | Goddard | 62/342 |

*Primary Examiner*—William E. Wayner
*Assistant Examiner*—William E. Tapolcai

[57] ABSTRACT

A hand or motor-operated ice cream freezer includes a beaterless, sealed food container immersed in a refrigerant within a sealed freezer shell. The freezer shell is rotated about its horizontal axis causing the food container therein to tumble end-over-end in response thereto. The liquid therein is forced against the abrupt walls of the food container which causes a thorough sloshing or mixing of the liquid. Elimination of the conventional beater element results in a very low required torque permiting the use of low power electric motors if desired. The food containers may be used as serving dishes or for storing any unconsumed food.

2 Claims, 4 Drawing Figures

FREEZERS

This is a continuation-in-part of application Ser. No. 344,122 filed on Mar. 23, 1973, now abandoned.

BACKGROUND OF THE INVENTION

This invention pertains to improved ice cream freezers and methods for freezing a liquid, and more particularly to one which employs no beater elements within the food container, but one wherein thorough mixing of the liquid is achieved through the effects of gravity and one wherein the food container may be totally immersed in the liquid refrigerant.

Ice cream freezers of current design employ a paddle or beater element within the food container which causes the desired mixing action as the food container is rotated about its vertical axis. While the end product of conventional freezers is generally of high quality, the beater element must be removed from the food container before the ice cream can be consumed. This creates some undesirable features such as waste and softening of the ice cream and is generally a very messy procedure. The instant invention overcomes these objectionable features without loss of quality in the end product.

OBJECTS AND SUMMARY OF THE INVENTION

The invention disclosed herein relates to a new and novel apparatus for agitating a liquid mixture, such as a home-made ice cream mix, while it undergoes the freezing process. This invention obviates the necessity for agitating paddles, or beaters, in intimate contact with the fluid mixture, as are required in the well-known conventional systems, and the inherent disadvantages in and objections to that system.

An apparatus is disclosed which will quickly freeze an ice cream or similar mixture while at the same time providing convenient serving or storage dishes, i.e., the food containers in which freezing takes place. Of utmost importance, however, is the elimination of the undesirable features and the resulting objectionable characteristic inherent in conventional freezers of the type wherein a gear-driven metal canister (food container) rotates about its vertical axis, while partially immersed in a salt/ice-water bath, with agitating paddles located within the canister in intimate contact with and causing constant stirring of the fluid to be frozen as the canister is caused to rotate.

Thus, the instant invention eliminates the very troublesome, time-consuming, inefficient and messy procedures (which are required to be performed before complete freezing is effected and while the mixture is still relatively soft) of (a) removing the canister driving means, (b) opening the canister, (c) removing the agitating paddles and scraping the frozen food therefrom, (d) "repacking" the canister, i.e., icing down and insulating the canister for a "hard" freezing, and (e) waiting for the soft mixture to harden before it is consumed. In the instant invention the food container need not be opened until a hard freeze of the mixture is obtained or whenever it is desired to consume the contents. This fact becomes increasingly important when it is desired to make ice cream which contains fruit or berries intermixed therein. In present freezers it is generally preferred to partially freeze the mixture, then open the canister, pour in the fruit or berries, then reseal the canister and continue freezing. In the instant invention the fruit or berries may be added to the initial liquid mixture and will be mixed and distributed uniformly by gravity during the freezing process as the food container is rotated, or tumbled, end-over-end, about a horizontal axis. Also, the instant invention requires a very low turning force, which remains constant throughout the freezing process, thus making operation of the freezer ideal for the entertainment of young children or simply for enabling the use of inexpensive, low-power electric motors. If a motor is utilized, it is not necessary to provide a clutch to prevent overload and burnout of the motor since the required driving force does not increase as the mixture within the food container hardens. Likewise, expensive gears may be eliminated or greatly simplified.

BRIEF DESCRIPTION OF THE DRAWINGS

Referring to the drawings in which the same characters of reference are employed to indicate corresponding or similar parts throughout the several figures of the drawings.

DESCRIPTION OF THE PREFERRED EMBODIMENTS

Figure 1:
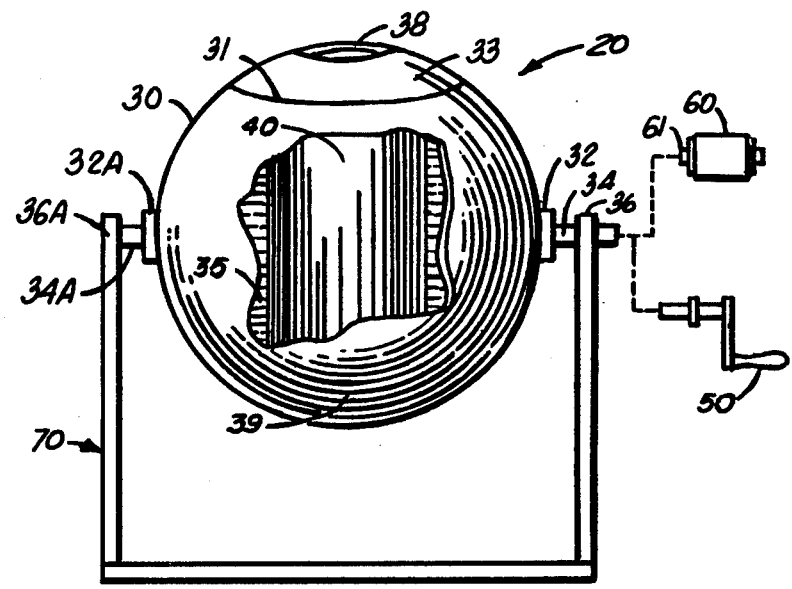
FIG. 1 is a front elevation view of one form of this invention wherein a cut-away shows a single food container in place.

Referring now to FIG. 1, the freezing apparatus, designated generally at 20 employs a hollow freezing compartment, or shell, 30 for receiving therein a food container 40 (or, if desired, a plurality of food containers as will be subsequently described) having therein a liquid mass 41 such as an ice cream mix to be frozen for consumption. The freezer shell 30 may be made of any suitable material such as metal, wood, plastic, etc., preferably having some insulating properties so as to minimize thermal conductivity between the inside and the outside of the freezer shell 30. The food container 40 is received through an aperture 31 in the shell 30 which is made sealable by a threaded plug, or plate, 33 or one having a clamp-on or friction-locking mechanism well known to those familiar with the art in the cap and closure field. The food container 40 is surrounded by a refrigerant 35 and may have a removably fixed relationship to the shell 30 as will be subsequently described.

The freezer shell 30 may likewise be made in various shapes such as, for example, a hollow sphere, cube, cylinder, rectangular box, etc. One preferred embodiment is spherical since the rotary or oscillatory motion of the freezer shell 30 about a horizontal axis, to be subsequently described, will be somewhat more compatible, or smooth, with this design.

To provide a means of rotation, the freezer shell 30 has two axle extensions, trunnions, or rotation points 34 and 34A diametrically opposed to each other and rigidly attached to plates 32 and 32A on the sides of the freezer shell 30. The points 32 and 32A are preferably on or near a line running through the center-of-gravity of the freezer shell 30, for example through the center of a plane dividing the sphere into two hemispheres, thereby forming a horizontal axis. The freezer shell 30, in a preferred embodiment, is rotatably affixed to a stand or base member 70 by means of a journal or bearing 36 and 36A supporting the freezer shell 30 at each of the trunnions 34 and 34A. One of the trunnions 34 is extended past the bearing 36 and terminates in a hand-crank 50 or is rigidly attached to the shaft 61 of an electric motor 60. The trunnion 34 may likewise be threaded to threadedly engage the hand-crank 50 or a motor shaft 61.

Figure 2:
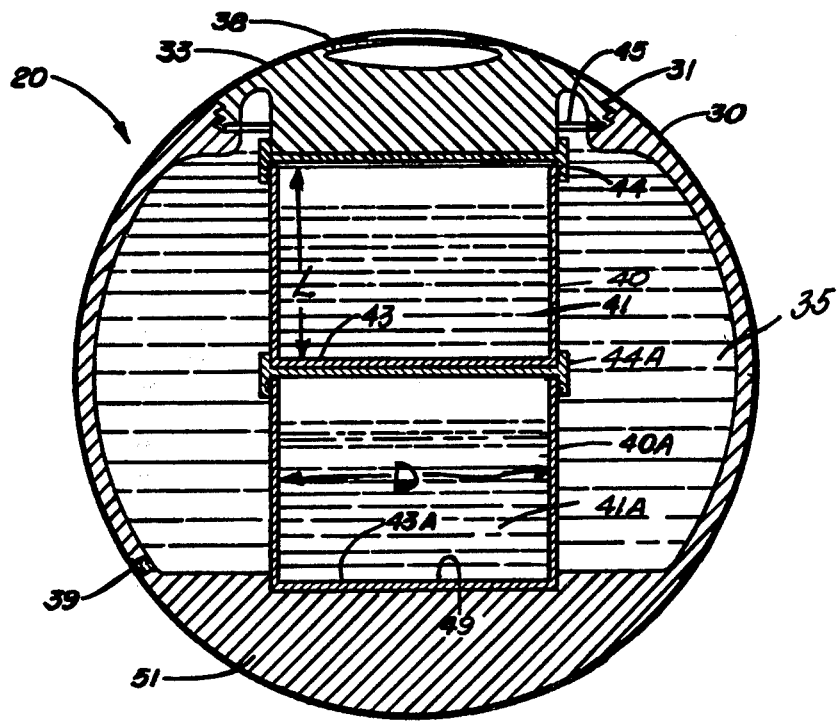
FIG. 2 is a cross-sectional view of another form of this invention taken substantially on a plane dividing the invention into two hemispheres.

Thus it can be seen that by rotating the trunnion 34 by means of a hand-crank 50 or other means, the freezer shell 30 is made to rotate or oscillate about its horizontal axis thereby causing the food container 40 to tumble end-over-end. It will be appreciated that in an alternative embodiment, the freezer shell 30 may be made without trunnions 34 and 34A or mounting means 70, as shown in FIG. 2, thus providing for hand-held oscillation or shaking, as when using a cocktail shaker, or, when a spherical shell 30 is employed, simply for random rolling motion on a surface, such as a ball being rolled back and forth between two children. It will also be appreciated that the freezing apparatus 20 must have sufficient physical strength to withstand these forces and shocks.

Referring now more specifically to FIG. 2. Inside the freezer shell 30 and removably attached or clamped in a fixed relation thereto is a food container 40 of length (or depth) L having a sealable open end 42 of width (or diameter) D for receiving and sealing therein a fluid mass 41 to be frozen or cooled. The food container 40 is preferably a hollow rectangular box or cylindrical container having a bottom or permanently sealed end 43 and sealable at the other end 42, and is mounted such that one axis, preferably its long axis in the non-cylindrical shapes, is approximately perpendicular to the axis of rotation of the freezer shell 30. The size of the food container 40 is such that it will fit easily into the freezer shell 30 through the aperture 31 therein (or open end where a cylindrical or box-shape freezer shell 30 is used—refer to FIG. 4) and allow sufficient room for a freezing medium or refrigerant 35, such as a conventional salt/ice-water bath, to completely surround the food container 40, be in intimate contact therewith, and thereby extract heat from and ultimately freeze the fluid 41 within the food container 40.

The food container 40 may be made of any suitable material such as aluminum, stainless steel, break-resistant glass, plastic, etc. In selecting the material, it should be kept in mind that this same food container 40 may, and should, be used to store any portion of ice cream remaining. Thus a container 40 made of a material having a high thermal conductivity, which is also durable and has an attractive design is preferable. In addition, it will be appreciated that the container material must be safe from a health standpoint, i.e., the material must not interact with any acids, etc. in the liquid 41 so as to make the liquid 41 distasteful or toxic to humans.

Likewise, the shape of the food container 40 should be considered and is, in fact, critical, since abrupt walls provide the means for sloshing or mixing of the liquid 41 during rotation of the container 40. In this regard, a cubical or rectangular box is preferred since these shapes, in addition to having a higher storage efficiency, will provide slightly more turbulence and, therefore, mixing, to the fluid 41 as the freeze shell 30 is rotated and the force of gravity acts upon the contents of the food container 40. For maximum mixing efficiency, the L over D ratio (L/D) of the food container 40 should not exceed 2.5, and preferably is in the range of 0.5 to 2.0 . Thusly, a more thorough sloshing or mixing of the liquid 41 is obtained along with any solid particles, such as fruit or berries, which are intermixed therein. Cylindrical food containers 40 are satisfactory provided end-over-end rotation is effected (rather than axial) and do have the distinct advantage of being able to utilize a threaded, screw-on cap 44 for easy assembly and sealing. Also, frozen food is more easily and completely removed therefrom. With the rectangular or square cross-section food container 40, a somewhat more complicated and less desirable assembly and sealing means is required. The latter means may consist of a clamp-on or friction-locking device of common design and well known to those familiar with the cap and closure art. A sealing gasket 45 made of rubber, neoprene or other suitable material may be desired (though not required in some designs) to provide a proper sealing of the aperture plug 33. Likewise, a similar gasket 47 may be desired for proper sealing of the cap 44 of the food container 40. These sealing methods are also well known in the art and include those where the material of the cap and/or container, eg. a resilient plastic, provides a sufficient seal in itself.

A plurality of food containers 40 and 40A may be utilized in order that different flavors of ice cream may be frozen simultaneously but separately, to provide more convenient sizes for storage, or for providing a plurality of individual serving dishes, such as for children's parties, etc. When two or three large food containers 40 are used, a "nesting" arrangement is desirable wherein the cap 44A of one food container 40A is formed to receive or seat the bottom 43 of a second food container 40 and so on, thus providing a stacked, or nested, arrangement. This configuration, when seated by the aperture plug 33 and bottom 51 of the freezer shell 30, eliminates any serious slipping and misalignment of the food containers 40, 40A, etc., which may occur during the freezing process. When it is desired to use a plurality of food containers as serving dishes (such as in small, half-pint or so) containers, they may be clamped or held in place between two plates and the assembly placed in the freezer shell 30.

Several methods are available to fix the relationship of the food container 40 within the freezer shell 30. By way of illustration, rather than limitation, the freezer shell 30, as in FIG. 2, may have a reinforced portion 51 positioned directly opposite the aperture 31 and having a recessed portion 49 capable of receiving the bottom 43A of the food container 40A. Other nesting arrangements are obvious, e.g., a recessed portion in the bottom 43A and a raised portion at 51; pins, dimples, etc. Then the food container 40 is placed within the freezer shell 30 such that its bottom 43 rests in the recess of the cap 44A thereby affording support for the food containers 40 and 40A. A refrigerant 35 is then placed in the freezer shell 30 through the aperture 31. The aperture plug 33 is then screwed or clamped in place such that it is seated in the cap 44 of the food container 40. The aperture plug 33 may or may not be required to exert pressure on the cap 44 depending upon the type of sealing means desired for the caps 44 and 44A and food containers 40 and 40A. That is, if the caps 44 and 44A independently seal the food containers 40 and 40A, pressure from the plug 33 is not required. If the caps 44 and 44A do not seal the food container independently, pressure from the plug 33 may be used to effect a seal. In either case, the nesting arrangement formed by the cup-shaped caps 44, 44A etc. may provide a means for securing the physical relationship between the food containers 40, 40A, etc. and the freezer shell 30.

Figure 4:
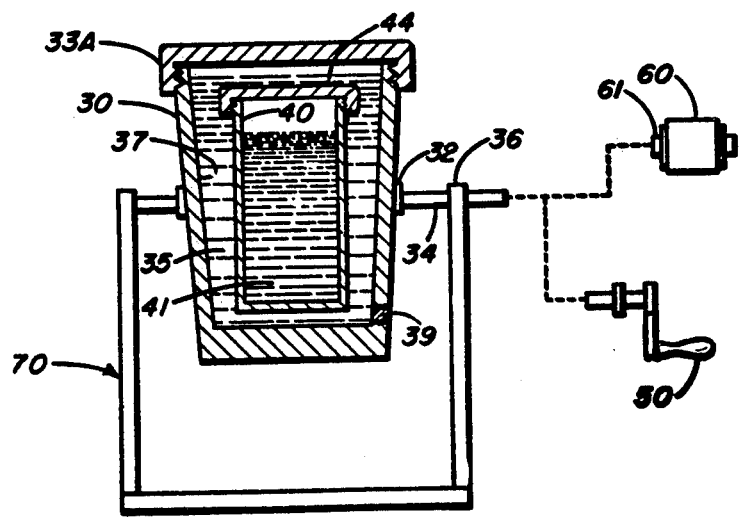
FIG. 4 is a cross-sectional view of still another form of this invention taken substantially on a plane dividing the invention into two halves.

By reference to FIG. 4 it will be appreciated that a food container 40 may be placed within the freezer shell 30 without having a fixed relationship thereto, i.e., the food container 40 is not secured to the freezer shell 30 but simply moves due to the forces acting upon the food container 40 by movement of the refrigerant 35 and/or movement of the inside surface 37 as the freezer shell 30 is rotated. This method is particularly effective where a cylindrical shell 30 is used, i.e., a shape similar to presently used freezers. In this configuration, of course, the food container 40 must be independently sealed by its cap 44 and gasket, if required. Also in this configuration, the caps do not need to be designed to "nest" with the bottoms of another container or the aperture plug 33, but may simply be flat.

In operation, the freezing apparatus 20 operates as follows: A fluid 41 to be frozen or cooled is placed into the food container 40, care being taken to leave sufficient room for expansion of the fluid 41 as it freezes. (Depending upon the method used to seal the food container 40, i.e., a screw-on cap 44, clamp-on cap 44 or one wherein sealing occurs simply due to the pressure exerted by the aperture plug 33 on the cap 44 etc., sealing of the food container 40 may or may not occur at this point.) The food container 40 is then placed into the freezer shell 30 through the aperture 31 in the shell 30. Then a refrigerant 35, such as the conventional salt/ice-water freeze bath, is placed into the freezer shell 30 and is allowed to communicate with and completely surround the food container 40. If the food container 40 is not sealed at this point, it must not be totally immersed in a liquid refrigerant 35, but only to a level where leakage into the container 40 does not occur. The aperture 31 of the freezer shell 30 is then sealed by a threaded or clamp-on plug or plate 33 by use of the handle 38 thereon. The plug 33 may or may not secure the food container 40 in a fixed relationship to the freezer shell 30, and may or may not exert pressure on the cap 44, depending upon the chosen design. The freezer shell 30 is then rotated by means of the crank 50 or a motor 60 at a rate fast enough to allow the liquid 41 to slosh back and forth (thereby mixing) but slow enough that centrifugal forces acting upon the liquid 41 will not keep the liquid 41 at one end of the container 40. The rotation rate is not critical and a rate from 25 to 150 revolutions per minute will be adequate.

Thus, a liquid 41 to be frozen or cooled is sealed, by means of a cap 44 having a gasket 47 or other sealing means, within a food container 40 which is removably fixed within the freezer shell 30 by means of pressure exerted by the aperture plug 33 or by the nesting arrangement provided by the specially shaped caps 44, 44A, etc. The freezer shell 30 is filled to the desired level with a refrigerant 35 and is likewise sealed, by means of plug 33 (and gasket 45, if required), to prevent any leakage of the refrigerant 35 from the freezer shell 30. By cranking the handle 50, or otherwise causing rotation of the trunnion 34, the entire freezer shell 30 and its contents are rotated, thereby causing rotation (tumbling) of the food container 40 within the freezer shell 30. The liquid 41, because of gravitational forces, is thus made to slosh from wall-to-wall of the food container 40 thereby effecting continuous mixing or agitation of the liquid 41, and solids suspended therein, so long as the freezer shell 30 is rotated and the liquid 41 is not frozen. When such time has elapsed that, from experience, it is known that freezing of the contents 41 of the food container 40 is complete to the point that no further mixing is required, rotation of the freezer shell 30 may be stopped. The food container 40 may then be allowed to remain in the freezer shell 30 for a hard freeze or may be removed for consumption of the food 41, or for storage in the freezer compartment of a conventional home electric freezer/refrigerator unit for later consumption.

In some instances a slightly better mixing may be effected by oscillating the freezer shell 30 back-and-forth through an arc which is less than 360 degrees rather than by simple continuous rotation. Thus it may be desirable to oscillate the freezer shell 30 through less than a 360 degree arc, then suddenly reverse the direction and oscillate in the opposite direction to the starting point and so on.

Figure 3:
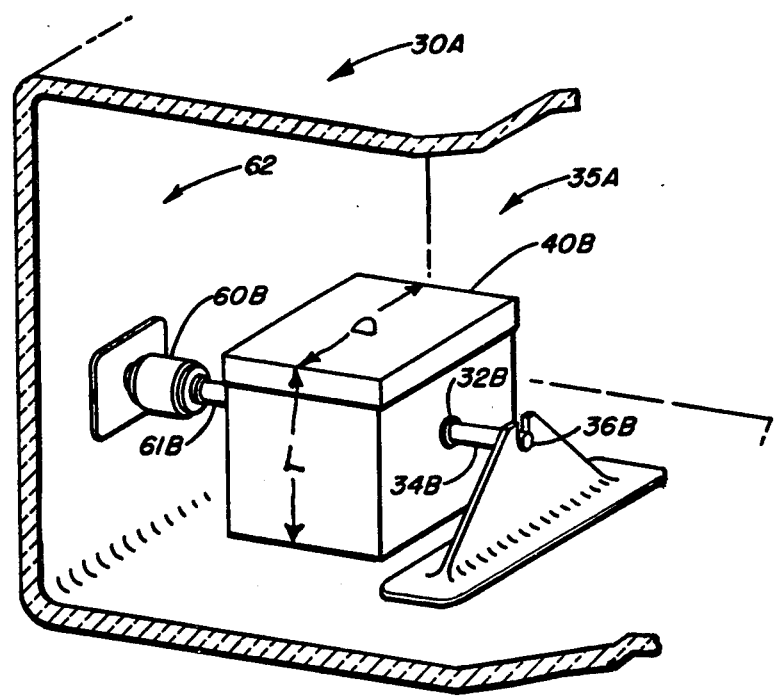
FIG. 3 is an approximate dimetric view of still another form of this invention.

Referring now to FIG. 3, wherein is shown another embodiment of the invention. In this embodiment the freezer shell 30 of FIGS. 1, 2 and 4 is supplanted by the freezer compartment 30A of a combination home refrigerator/freezer. The freezing medium or refrigerant 35A is simply the refrigerated air supplied to the freezer unit 30A. A food container 40B has a trunnion 34B similar and analogous to the trunnion 34 of FIG. 1. Journal or bearing means 36B are utilized to support the food container 40B at its trunnion 34B, and a motor 60B attached to a wall 62 of the freezer compartment 30A provides the necessary force for rotation through its shaft 61A. A food container 40B in the shape of a rectangular box is shown; however, it will be appreciated that any of the other shapes mentioned as acceptable in the foregoing configurations, could just as easily be substituted here. The salient difference in this embodiment is, of course, the direct rotation of the food container 40B by driving means 60B rather than having it fixedly attached inside a rotating shell 30 as in FIGS. 1 and 2. Also, in this configuration, the food container 40B must be independently sealed.

While in the foregoing there have been shown and described the preferred embodiments of this invention, it is to be understood that minor changes in the details of construction, combination, and arrangement of parts may be resorted to without departing from the spirit and scope of the invention as claimed.

What I claim is:

1. A freezing or cooling apparatus comprising:
 a. an outer container having a sealable aperture therein;
 b. first sealing means for sealing said aperture of said outer container thereby making said aperture impervious to a refrigerant which may be placed within said outer container;
 c. a sealable food container having no movable elements therein, having a length or depth L, a diameter or width D, and an L/D ratio in the range of 0.5 to 2.5, and further, having at least one pair of substantially parallel walls, for receiving therein a liquid mixture, said food container being receivable through said aperture in said outer container, being completely enclosed by said outer container when said aperture of said outer container is sealed, and adapted to be in intimate contact with a refrigerant which may be placed within said outer container;

d. second sealing means for sealing said food container thereby preventing contamination or leakage of any liquid mixture therein; and,
e. means for rotating said food container in an end-over-end manner whereby the liquid within said food container is caused to slosh back and forth between said parallel walls of said food container.

2. The apparatus of claim 1 wherein end-over-end rotation of said food container is obtained by rotation of said outer container.

* * * * *